US011387470B2

(12) United States Patent
Gambini et al.

(10) Patent No.: US 11,387,470 B2
(45) Date of Patent: Jul. 12, 2022

(54) CATHODE FLOW FIELD DISTRIBUTION FOR ELECTROCHEMICAL CELL STACKS

(71) Applicant: Nuvera Fuel Cells, LLC, Billerica, MA (US)

(72) Inventors: Filippo Gambini, Boston, MA (US); Scott Blanchet, Chelmsford, MA (US); Olga Polevaya, Needham, MA (US); Edward Domit, Westford, MA (US); Andrew Baugher, Brighton, MA (US); Patrick Burand, Winthrop, MA (US)

(73) Assignee: Nuvera Fuel Cells, LLC, Billerica, MA (US)

( * ) Notice: Subject to any disclaimer, the term of this patent is extended or adjusted under 35 U.S.C. 154(b) by 66 days.

(21) Appl. No.: 16/249,946

(22) Filed: Jan. 17, 2019

(65) Prior Publication Data

US 2019/0221868 A1 Jul. 18, 2019

Related U.S. Application Data

(60) Provisional application No. 62/618,228, filed on Jan. 17, 2018, provisional application No. 62/618,146, filed on Jan. 17, 2018.

(51) Int. Cl.
*H01M 8/0258* (2016.01)
*H01M 8/0232* (2016.01)
(Continued)

(52) U.S. Cl.
CPC ....... *H01M 8/0258* (2013.01); *H01M 8/0228* (2013.01); *H01M 8/0232* (2013.01);
(Continued)

(58) Field of Classification Search
None
See application file for complete search history.

(56) References Cited

U.S. PATENT DOCUMENTS

2006/0222924 A1* 10/2006 Matsuoka ......... H01M 8/04223
429/413
2010/0178580 A1* 7/2010 Connor ................ H01M 8/241
429/456
(Continued)

FOREIGN PATENT DOCUMENTS

DE 10 2015 213950 A1 1/2017

OTHER PUBLICATIONS

PCT Notification of Transmittal of the International Search Report and the Written Opinion of the International Searching Authority issued in International Application No. PCT/US2019/014004, dated Apr. 4, 2019, 13 pages.

*Primary Examiner* — Haroon S. Sheikh
(74) *Attorney, Agent, or Firm* — Finnegan, Henderson, Farabow, Garrett & Dunner, LLP

(57) ABSTRACT

An electrochemical cell stack is provided. The electrochemical cell stack has a plurality of electrochemical cells. Each electrochemical cell has a membrane electrode assembly which includes a cathode catalyst layer, an anode catalyst layer, and a polymer membrane interposed between the catalyst layer and the anode layer. Each electrochemical cell also has an anode plate and a cathode plate with the membrane electrode assembly interposed therebetween, and a cathode flow field positioned between the cathode plate and the cathode catalyst layer. The cathode flow field includes a porous structure having a plurality of pores having an average pore size. The plurality of electrochemical cells has a first electrochemical cell positioned at a first end of the electrochemical cell stack. The porous structure of the first electrochemical cell has an average pore size greater than the average pore size of the porous structures of the plurality of electrochemical cells. And, the porous structure of the first electrochemical cell has a flow resistance less (Continued)

than an average flow resistance of the porous structures of the plurality of electrochemical cells.

20 Claims, 11 Drawing Sheets

(51) Int. Cl.
    *H01M 8/1004*    (2016.01)
    *H01M 8/0228*    (2016.01)
    *H01M 8/241*    (2016.01)
    *H01M 8/10*    (2016.01)

(52) U.S. Cl.
    CPC .......... *H01M 8/1004* (2013.01); *H01M 8/241* (2013.01); *H01M 2008/1095* (2013.01)

(56) References Cited

U.S. PATENT DOCUMENTS

| | | | |
|---|---|---|---|
| 2011/0200903 A1* | 8/2011 | Hamada | H01M 8/04291 |
| | | | 429/444 |
| 2013/0337366 A1 | 12/2013 | Blanchet et al. | |
| 2015/0333340 A1* | 11/2015 | Lunt | C25B 11/02 |
| | | | 204/279 |
| 2018/0261853 A1* | 9/2018 | Okuno | H01M 8/0232 |

* cited by examiner

CATHODE FLOW FIELD DISTRIBUTION FOR ELECTROCHEMICAL CELL STACKS

The present application claims the benefit of priority to U.S. Provisional Application No. 62/618,146, filed Jan. 17, 2018, and U.S. Provisional Application No. 62/618,228, filed Jan. 17, 2018, each of which are incorporated herein by reference in its entirety.

The present disclosure is directed to electrochemical cells and electrochemical cell stacks, and more particularly, to cathode flow field distribution for electrochemical cell stacks.

Electrochemical cells, usually classified as fuel cells or electrolysis cells, are devices used for generating current from chemical reactions, or inducing a chemical reaction using a flow of current. For example, a fuel cell converts the chemical energy of fuel (e.g., hydrogen, natural gas, methanol, gasoline, etc.) and an oxidant (air or oxygen) into electricity and waste products of heat and water. A basic fuel cell comprises a negatively charged anode, a positively charged cathode, and an ion-conducting material called an electrolyte.

Different fuel cell technologies utilize different electrolyte materials. A Proton Exchange Membrane (PEM) fuel cell, for example, utilizes a polymeric ion-conducting membrane as the electrolyte. In a hydrogen PEM fuel cell, hydrogen atoms are electrochemically split into electrons and protons (hydrogen ions) at the anode. The electrons then flow through the circuit to the cathode and generate electricity, while the protons diffuse through the electrolyte membrane to the cathode. At the cathode, hydrogen protons combine with electrons and oxygen (supplied to the cathode) to produce water and heat.

An electrolysis cell represents a fuel cell operated in reverse. A basic electrolysis cell functions as a hydrogen generator by decomposing water into hydrogen and oxygen gases when an external electric potential is applied. The basic technology of a hydrogen fuel cell or an electrolysis cell can be applied to electrochemical hydrogen manipulation, such as, electrochemical hydrogen compression, purification, or expansion. Electrochemical hydrogen manipulation has emerged as a viable alternative to the mechanical systems traditionally used for hydrogen management. Successful commercialization of hydrogen as an energy carrier and the long-term sustainability of a "hydrogen economy" depend largely on the efficiency and cost-effectiveness of fuel cells, electrolysis cells, and other hydrogen manipulation/management systems.

In operation, a single fuel cell can generally generate about 1 volt. To obtain the desired amount of electrical power, individual fuel cells are combined to form a fuel cell stack, wherein fuel cells are stacked together sequentially. Each fuel cell may include a cathode, an electrolyte membrane, and an anode. A cathode/membrane/anode assembly constitutes a "membrane electrode assembly," or "MEA," which is typically supported on both sides by bipolar plates. Reactant gases or fuel (e.g., hydrogen) and oxidant (e.g., air or oxygen) are supplied to the electrodes of the MEA through flow fields. In addition to providing mechanical support, the bipolar plates (also known as flow field plates or separator plates) physically separate individual cells in a stack while electrically connecting them. A typical fuel cell stack includes manifolds and inlet ports for directing the fuel and oxidant to the anode and cathode flow fields, respectively. A fuel cell stack also includes exhaust manifolds and outlet ports for expelling the excess fuel and oxidant. A fuel cell stack may also include manifolds for circulating coolant fluid to help expel heat generated by the fuel cell stack.

As described above, water is generated at the cathode as a by-product of the conversion of a fuel and an oxidant into electricity. This water is typically removed from the electrochemical cells by virtue of the flow of the reactant gases, for example, oxygen. Inefficient removal of water may lead to flooding of the electrochemical cell. Flooding of the electrochemical cell may lead to a reduction or complete cessation of reactant gas flow. Excess accumulation of water can lead to failure of the individual electrochemical cell, which can then lead to instability and/or failure of the electrochemical cell stack.

In a typical electrochemical cell stack, the end electrochemical cells may have a different operating temperature than the electrochemical cells positioned in between. Typically, the operating temperature of these end electrochemical cells is less than the operating temperature of the electrochemical cells positioned in between the end electrochemical cells by virtue of the fact that the end electrochemical cells only have one heat-producing neighbor electrochemical cell, whereas the electrochemical cells positioned in between experience heat from two heat-producing neighbor electrochemical cells. Not only do the end cells experience heat from only one heat-producing neighbor electrochemical cell, but they also more directly contact the atmosphere through the end components of the electrochemical cell stack assembly, such as current extraction plates and end plates, which house the electrochemical cell stack, and thus are subjected to conductive cooling.

Without being bound to any particular theory, increased cooling of the end cells may lead to accumulation of water, which may detrimentally affect the performance of the individual cell and the electrochemical cell stack. Attempts to address this issue include adding heaters positioned adjacent to the end cells in an effort to maintain an even operating temperature throughout all of the electrochemical cells. However, addition of such heaters adds unnecessary complexity, weight, parasitic energy, and space consumption to an electrochemical cell stack assembly. Accordingly, there exists a need for improved electrochemical cell stack designs that control the amount of water accumulation in the electrochemical cells, particularly in the end electrochemical cells.

In consideration of the aforementioned electrochemical cell stack design considerations, the present disclosure is directed toward an electrochemical cell stack directed to overcoming one or more of the problems set for above and/or other problems with existing technologies.

In one aspect, the present disclosure is directed to an electrochemical cell stack. The electrochemical cell stack may include a plurality of electrochemical cells. Each electrochemical cell may include a membrane electrode assembly comprising a cathode catalyst layer, an anode catalyst layer, and a polymer membrane interposed between the cathode catalyst layer and the anode catalyst layer. Each electrochemical cell may also include an anode plate and a cathode plate with the membrane electrode assembly interposed therebetween; and a cathode flow field positioned between the cathode plate and the cathode catalyst layer, wherein the cathode flow field comprises a porous structure having a plurality of pores having an average pore size. In some embodiments, the plurality of electrochemical cells may include a first electrochemical cell positioned at a first end of the stack. In some embodiments, the porous structure of the first electrochemical cell may have an average pore size greater than an average pore size of the porous structures of the plurality of electrochemical cells. In some embodiments, the porous structure of the first electrochemical cell may have a flow resistance less than an average flow resistance of the porous structures of the plurality of electrochemical cells. In some embodiments, the porous structure of the first electrochemical cell may have a flow dimension (i.e., thickness) greater than that of the porous structures of the plurality of electrochemical cells.

In some embodiments, the average pore size of the porous structure of the first electrochemical cell is about 5% to about 50% greater than the average pore size of the porous structure of the plurality of electrochemical cells. In other embodiments, the flow resistance of the porous structure of the first electrochemical cell is about 5% to about 50% less than the average flow resistance of the porous structure of the plurality of electrochemical cells. In yet other embodiments, the flow resistance of the porous structure of the first electrochemical cell is about 15% less than the average flow resistance of the porous structure of the plurality of electrochemical cells.

In some embodiments, the plurality of electrochemical cells includes a last electrochemical cell positioned at the opposite end of the stack to the first electrochemical cell, wherein the porous structure of the last electrochemical cell has an average pore size greater than an average pore size of the porous structures of the plurality of electrochemical cells. In some embodiments, the average pore size of the porous structure of the last electrochemical cell is about 5% to about 50% greater than the average pore size of the porous structure of the plurality of electrochemical cells. In some embodiments, the flow resistance of the porous structure of the last electrochemical cell is about 5% to about 50% less than the average flow resistance of the porous structure of the plurality of electrochemical cells. In some embodiments, the flow resistance of the porous structure of the last electrochemical cell is about 15% less than the average flow resistance of the porous structure of the plurality of electrochemical cells.

In some embodiments, the plurality of electrochemical cells includes a second electrochemical cell positioned adjacent the first electrochemical cell, wherein the porous structure of the second electrochemical cell positioned adjacent the first electrochemical cell has an average pore size greater than the average pore size of the porous structures of the plurality of electrochemical cells. In some embodiments, the average pore size of the porous structure of the second electrochemical cell is about 5% to about 50% greater than the average pore size of the porous structure of the plurality of electrochemical cells. In some embodiments, the flow resistance of the porous structure of the second electrochemical cell is about 5% to about 50% less than the average flow resistance of the porous structure of the plurality of electrochemical cells. In some embodiments, the flow resistance of the porous structure of the last electrochemical cell is about 15% less than the average flow resistance of the porous structure of the plurality of electrochemical cells.

In some embodiments, the plurality of electrochemical cells includes a third electrochemical cell positioned adjacent the last electrochemical cell, wherein the porous structure of the third electrochemical cell positioned adjacent the last electrochemical cell has an average pore size greater than the average pore size of the porous structures of the plurality of electrochemical cells. In some embodiments, the average pore size of the porous structure of the third electrochemical cell is about 5% to about 50% greater than the average pore size of the porous structure of the plurality of electrochemical cells. In some embodiments, the flow resistance of the porous structure of the third electrochemical cell is about 5% to about 50% less than the average flow resistance of the porous structure of the plurality of electrochemical cells. In some embodiments, the flow resistance of the porous structure of the third electrochemical cell is about 5% less than the average flow resistance of the porous structure of the plurality of electrochemical cells.

In some embodiments, the porous structure of at least one of the plurality of electrochemical cells includes nickel and chromium. In some embodiments, the nickel concentration ranges from about 60% to about 80% by mass and the chromium concentration ranges from about 20% to about 40% by mass. In some embodiments, the porous structure of the at least one electrochemical cell has a first surfaces with a higher chromium concentration than an opposite second surface. In some embodiments, the chromium concentration of the first surface ranges from about 3% to about 50% by mass. In some embodiments, the opposite second surface has a chromium concentration of less than about 3% by mass. In some embodiments, the chromium concentration ranges from about 3% to about 6% by mass and the nickel concentration ranges from about 74% to about 87% by mass.

In some embodiments, the porous structure of at least one of the plurality of electrochemical cells further includes tin. In some embodiments, tin concentration ranges from about 10% to about 20% by mass.

In some embodiments, the porous structure has a plurality of interdigitated feed channels and discharge channels stamped into the surface of the porous structure facing the cathode plate, wherein the feed channels start at and are in fluid communication with a first cathode distribution channel and extend toward a second cathode distribution channel, and the discharge channels end at and are in fluid communication with the second cathode distribution channel and extend toward the first cathode distribution channel. In some embodiments, the width and/or the depth of the feed channels and the discharge channels vary along the length of the porous structure. In some embodiments, the width of the feed channels narrow extending away from the first cathode distribution channel toward the second cathode distribution channel, and the width of the discharge channels widen extending away from the first cathode distribution channel toward the second cathode distribution channel. In some embodiments, the depth of the feed channels decreases extending away from the first cathode distribution channel toward the second cathode distribution channel, and the depth of the discharge channels increases extending away from the first cathode distribution channel toward the second cathode distribution channel.

In some embodiments, the cross-sectional area of the feed channels decreases extending away from the first cathode distribution channel toward the second cathode distribution channel, and the cross-sectional area of the discharge channels increases extending away from the first cathode distribution channel toward the second cathode distribution channel. In some embodiments, the cross-sectional area of the feed channels decreases at a rate about equal to the rate at which an oxidant flows out of the feed channels and diffuses into the porous structure, and the cross-sectional area of the discharge channels increases at a rate about equal to the rate at which an oxidant flows out of the porous structure into the discharge channels, thereby maintaining an about constant velocity of oxidant through the feed channels and the discharge channels.

In some embodiments, the porous structure includes one or more land sections formed between the feed channels and the discharge channels, wherein the thickness of the one or more land sections varies along the length of the porous structure.

In another aspect, the present disclosure is directed to an electrochemical cell stack. The electrochemical cell stack may include a plurality of electrochemical cells. Each electrochemical cell may include a membrane electrode assembly comprising a cathode catalyst layer, an anode catalyst layer, and a polymer membrane interposed between the cathode catalyst layer and the anode catalyst layer. Each electrochemical cell may also include an anode plate and a cathode plate with the membrane electrode assembly interposed therebetween, where the anode plate defines a plurality of channels that form an anode flow field facing the anode catalyst layer. Each electrochemical cell may also include a cathode flow field positioned between the cathode plate and the cathode catalyst layer, where the cathode flow field comprises a porous structure. In some embodiments, the plurality of channels forming the anode flow field are generally square-shaped corrugated channels, the plurality of channels include anode channels open to the anode side configured to direct the flow of fuel across the anode catalyst layer, and the plurality of channels also include coolant channels open to the reverse side configured to direct coolant flow. In some embodiments, the plurality of electrochemical cells includes a first electrochemical cell positioned at a first end of the electrochemical cell stack. In some embodiments, the porous structure of the first electrochemical cell has an average pore size greater than an average pore size of the porous structures of the plurality of electrochemical cells. In some embodiments, the porous structure of the first electrochemical cell has a flow resistance less than an average flow resistance of the porous structures of the plurality of electrochemical cells.

In some embodiments, the coolant channels each have a coolant channel width of A and the anode channels each have an anode channel width of B and a ratio of the coolant channel width A to the anode channel width B is greater than about 1 and less than about 6.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the present disclosure and together with the description, serve to explain the principles of the disclosure.

Reference will now be made in detail to the present exemplary embodiments of the present disclosure, examples of which are illustrated in the accompanying drawings. Wherever possible, the same reference numbers will be used throughout the drawings to refer to the same or like parts. Although described in relation to an electrochemical cell, in particular, a fuel cell employing hydrogen, oxygen, and water, it is understood that the devices and methods of the present disclosure can be employed with various types of fuel cells and electrochemical cells, including, but not limited to electrolysis cells, hydrogen purifiers, hydrogen expanders, and hydrogen compressors.

Figure 1:
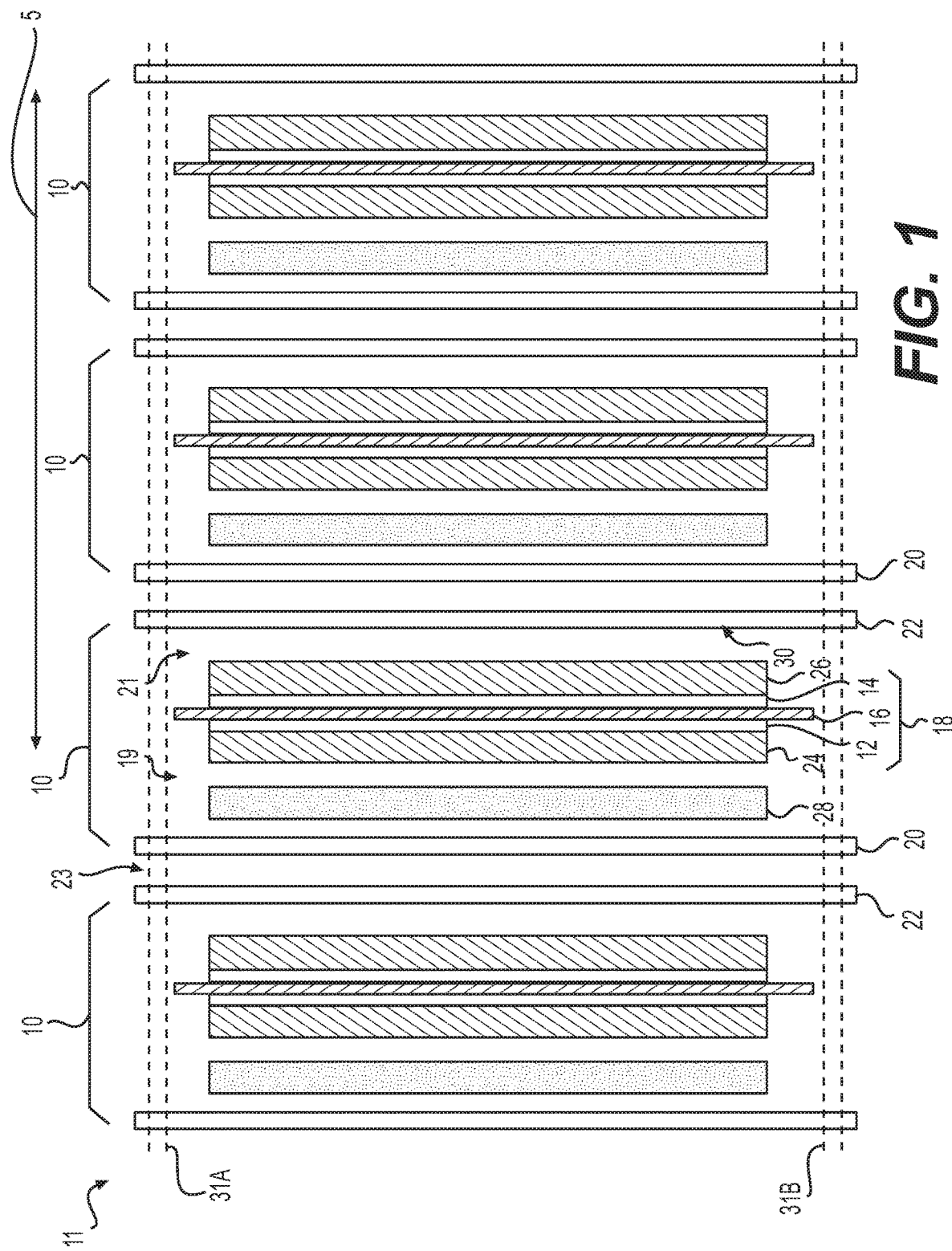
FIG. 1 is a side schematic view of a plurality of electrochemical cells (e.g., fuel cells) stacked together, according to an exemplary embodiment.

FIG. 1 is a side schematic side view of a plurality of electrochemical cells, for example, fuel cells 10 stacked together along a longitudinal axis 5 to form at least a portion of a fuel cell stack 11, according to an exemplary embodiment. A fuel cell 10 can comprise a cathode catalyst layer 12, which may also be referred to herein as a cathode, an anode catalyst layer 14, which may also be referred to herein a anode, and a proton exchange membrane (PEM) 16 disposed between cathode catalyst layer 12 and anode catalyst layer 14, which collectively may be referred to as a membrane electrode assembly (MEA) 18. PEM 16 can comprise a pure polymer membrane or composite membrane with other material, for example, silica, heteropolyacids, layered metal phosphates, phosphates, and zirconium phosphates can be embedded in a polymer matrix. PEM 16 can be permeable to protons while not conducting electrons. Cathode catalyst layer 12 and anode catalyst layer 14 can comprise porous carbon electrodes containing a catalyst. The catalyst material, for example platinum, platinum cobalt alloy, or non-platinum group metal (non-PGM), may increase the reaction of oxygen and fuel. In some embodiments, cathode catalyst layer 12 and anode catalyst layer 14 may have an average pore size of about 1 µm.

Fuel cell 10 can comprise two bipolar plates, for example, a cathode plate 20 and an anode plate 22. Cathode plate 20 may be positioned adjacent cathode catalyst layer 12 and anode plate 22 may be positioned adjacent anode catalyst layer 14. MEA 18 can be interposed and enclosed between cathode plate 20 and anode plate 22. A cathode compartment 19 may be formed between MEA 18 and cathode plate 20 and an anode compartment 21 may be formed between MEA 18 and anode plate 22. Cathode plate 20 and anode plate 22 can act as current collectors, provide access flow passages for fuel and oxidant to the respective electrode surfaces (e.g., anode catalyst layer 14 and cathode catalyst layer 12), and provide flow passages for the removal of water formed during operation of fuel cell 10. Cathode plate 20 and anode plate 22 can also define flow passages for coolant fluid (e.g., water, glycol, or water glycol mixture). For example, between cathode plate 20 and anode plate 22 of adjacent fuel cells 10 a coolant compartment 23 may be formed, which is configured to circulate coolant fluid between adjacent fuel cells 10. Heat generated by fuel cells 10 can be transferred to the coolant fluid and be carried away by the circulation of the coolant fluid. Cathode plate 20 and anode plate 22 may be made from, for example, aluminum, steel, stainless steel, titanium, copper, Ni—Cr alloy, graphite or any other suitable electrically conductive material.

In some embodiments, for example, as illustrated in FIG. 1, fuel cell 10 may also include electrically-conductive gas diffusion layers (e.g., cathode gas diffusion layer 24 and anode gas diffusion layer 26) within fuel cell 10 on each side of MEA 18. Gas diffusion layers 24, 26 may serve as diffusion media enabling the transport of gases and liquids within the cell, provide electrically conduction between cathode plate 20, anode plate 22, and MEA 18, aid in the removal of heat and process water from fuel cell 10, and in some cases, provide mechanical support to PEM 16. Gas diffusion layers 24, 26 can comprise a woven or non-woven carbon cloth with cathode catalyst layer 12 and anode catalyst layer 14 coated on the sides facing PEM 16. In some embodiments, cathode catalyst layer 12 and anode catalyst layer 14 may be coated onto either the adjacent GDL 24, 26 or PEM 16. In some embodiments, gas diffusion layers 24, 26 may have an average pore size of about 10 μm.

Fuel cell 10 may further include flow fields positioned on each side of MEA 18. For example, fuel cell 10 may include a cathode flow field 28, which may comprise a porous structure positioned between cathode plate 20 and GDL 24 and an anode flow field 30, which may be formed by anode plate 22, as described further herein. The flow fields may be configured to enable fuel and oxidant on each side of MEA 18 to flow through and reach MEA 18. These flow fields may facilitate even distribution of fuel and oxidant to cathode and anode catalyst layers 12, 14. Even distribution of fuel and oxidant to the catalyst layers 12, 14 may increase the performance of fuel cell 10. GDL 24 may provide mechanical protection of cathode catalyst layer 12 from cathode flow field 28.

It is to be understood that although only one fuel cell 10 in FIG. 1 includes reference numerals for cathode catalyst layer 12, anode catalyst layer 14, proton exchange membrane 16, membrane electrode assembly (MEA) 18, cathode compartment 19, cathode plate 20, anode compartment 21, anode plate 22, coolant compartment 23, gas diffusion layer 24, gas diffusion layer 26, cathode flow field 28, and anode flow field 30, the other fuel cells 10 of stack 11 may include the same elements.

Fuel cell stack 11 may also include a plurality of fluid manifolds 31A, 31B extending along longitudinal axis 5 defined by the series of stacked cathode plates 20 and anode plates 22 of fuel cells 10. Fluid manifolds 31A, 31B may be configured for feeding fuel (e.g., hydrogen) and oxidant (e.g., oxygen) to MEA 18 of each fuel cell 10 and discharging reactant products (e.g., unreacted fuel, unreacted oxidant, and water) from MEA 18 of each fuel cell. Fluid manifolds 31A, 31B may also be configured for feeding and discharging coolant fluid through coolant compartments 23. The direction of flow through fluid manifolds 31A, 31B, cathode compartments 19, anode compartments 21, and coolant compartments 23 may vary. For example, in some embodiments the flow through the manifolds and compartments may be concurrent while in other embodiments, one or more of the flow paths may be countercurrent. For example, in some embodiments, the flow of fuel through anode compartment 21 may be countercurrent to the flow of oxidant through cathode compartments 19. Fluid manifolds 31A, 31B may fluidly connect to MEA 18 via passages and ports. Specific manifolds, passages, and ports may be identified herein by as "feed" or "discharge" and "inlet" or "outlet," but it is to be understood these designations may be determined based on the direction of flow and the direction of flow may be switched. Changing the direction of flow may change these designations.

Figure 2:
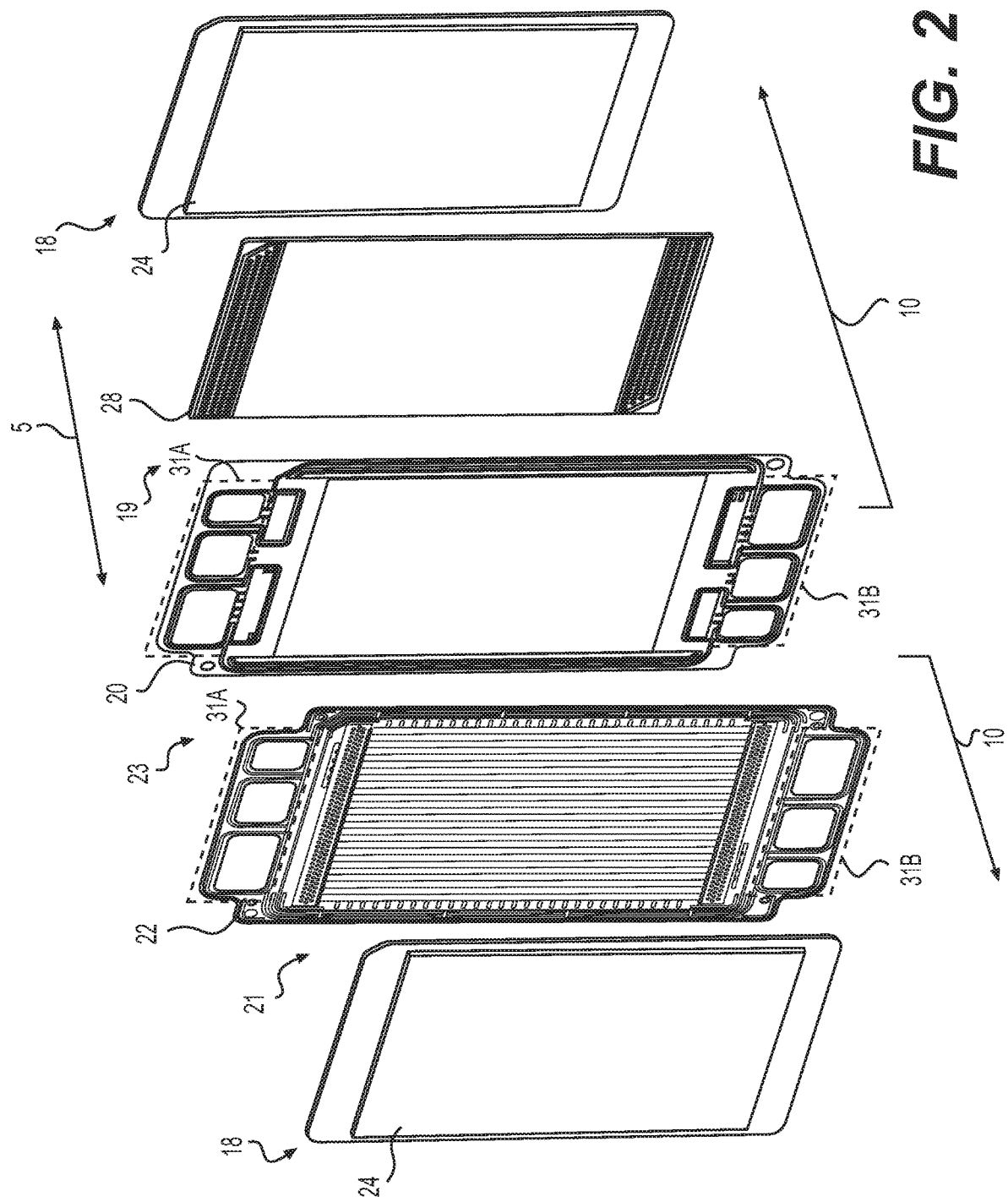
FIG. 2 is a side perspective view of portions of adjacent fuel cells of FIG. 1, according to an exemplary embodiment.

FIG. 2 shows a partially exploded side perspective view of portions of adjacent fuel cells 10. For example, FIG. 2 shows MEA 18, GDL 24, and anode plate 22 of one fuel cell 10 and also cathode plate 20, cathode flow field 28, MEA 18, and GDL 24 of an adjacent fuel cell 10. Anode compartment 21 may be formed between adjacent MEA 18 and anode plate 22. Coolant compartment 23 may be formed between adjacent anode plate 22 and cathode plate 20. Cathode compartment 19 may be formed between adjacent cathode plate 20 and MEA 18. Cathode compartment 19 may contain cathode flow field 28. As shown in FIG. 2, fuel cells 10 may include fluid manifolds 31A, 31B, which may also be referred to as upper and lower fluid manifolds. Fluid manifolds 31A, 31B may extend along longitudinal axis 5, as shown in FIG. 2.

Figure 3:
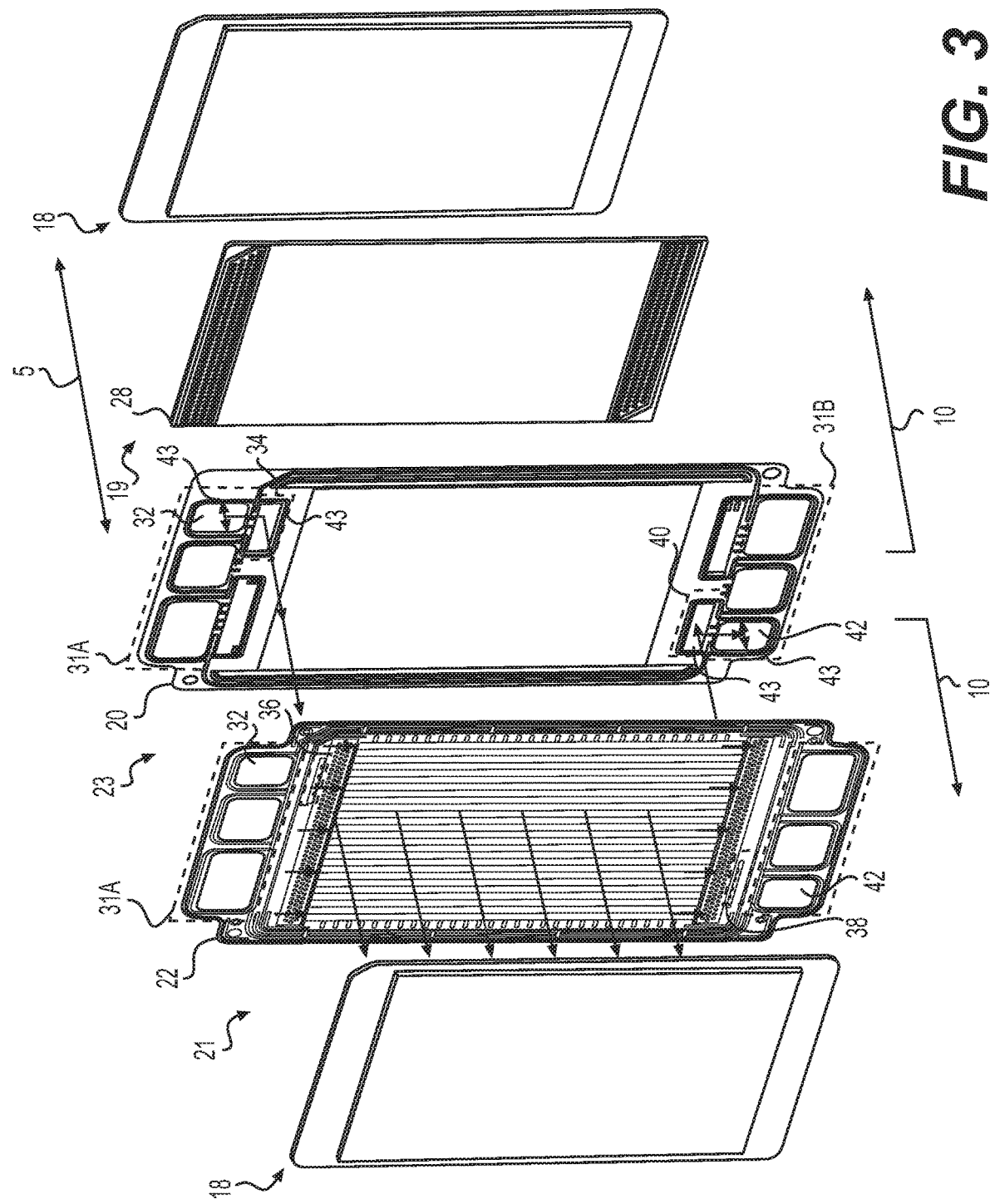
FIG. 3 is a side perspective view of FIG. 2 illustrating a flow path of fuel through a fuel cell, according to an exemplary embodiment.
Figure 4:
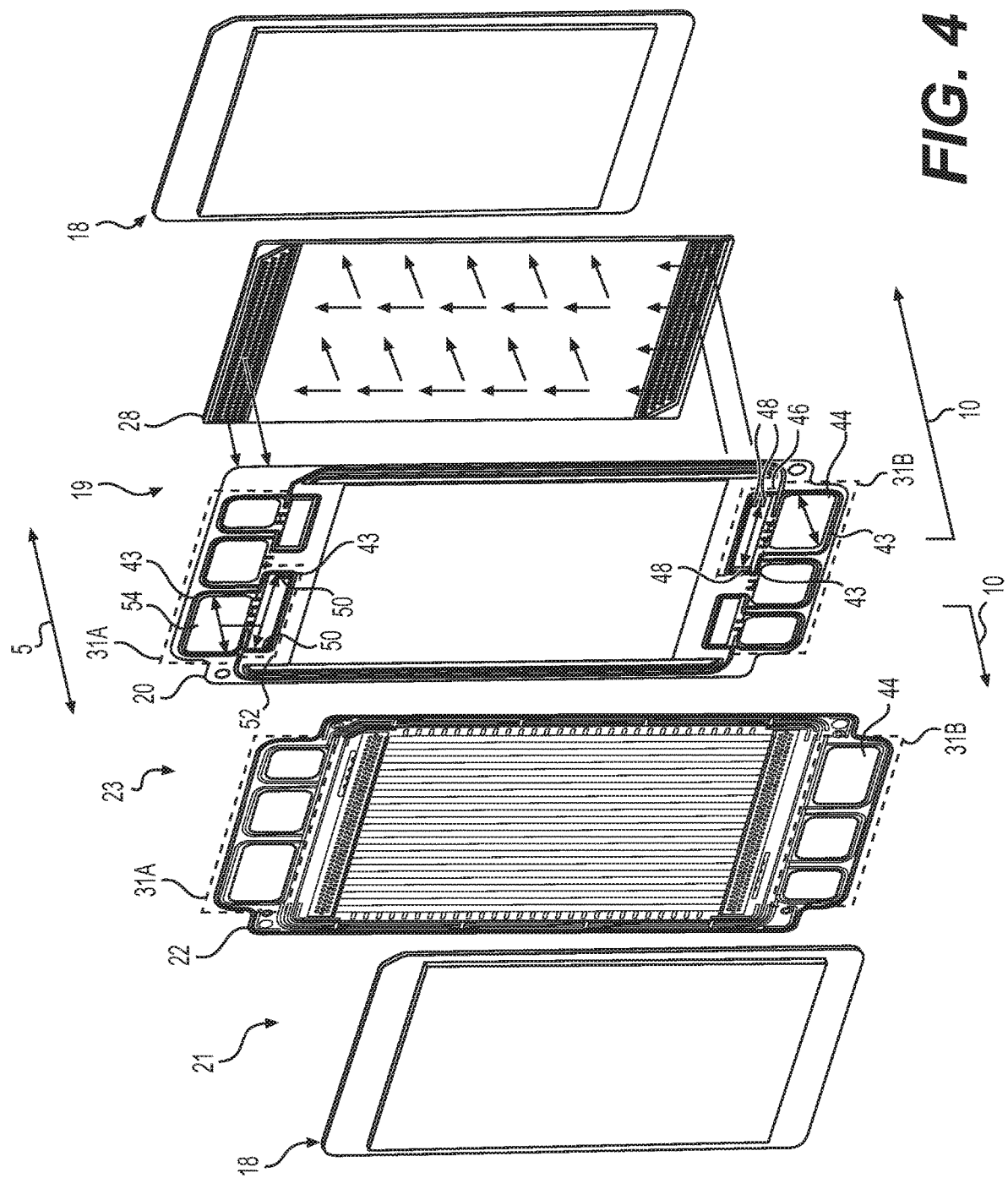
FIG. 4 is a side perspective view of FIG. 2 illustrating a flow path of oxidant through a fuel cell, according to an exemplary embodiment.
Figure 5:
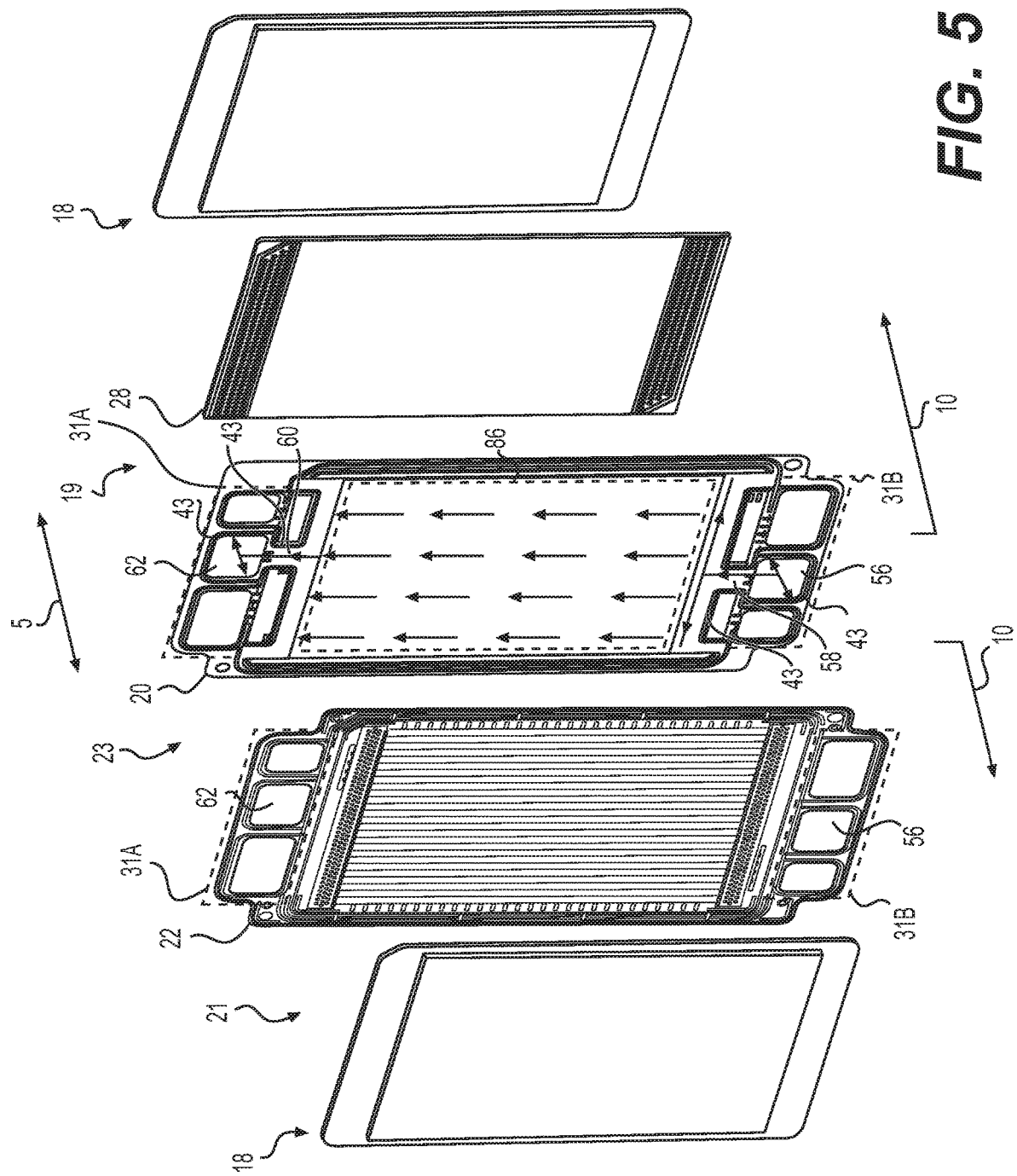
FIG. 5 is a side perspective view of FIG. 2 illustrating a flow path of coolant fluid through adjacent fuel cells, according to an exemplary embodiment.

FIGS. 3-5 illustrate flow paths of fuel, oxidant, and cooling fluid through fuel cells 10, according to one illustrative embodiment. But it is to be understood that for other embodiments the direction of one or more of the flow paths may be switched, for example, by reversing the direction of flow. FIG. 3 illustrates a flow path for fuel circulated through the anode side of MEA 18 of fuel cell 10, FIG. 4 illustrates a flow path for oxidant circulated through the cathode side of MEA 18 of fuel cell 10, and FIG. 5 illustrates a flow path for coolant fluid circulated between adjacent fuel cells 10.

Referring now to FIG. 3, first fluid manifolds 31A may include at least one anode feed manifold 32 that may fluidly connect and direct fuel through at least one anode inlet passage 34 through at least one anode inlet port 36 into anode compartment 21. Fuel (e.g., unreacted fuel) from anode compartment 21 may be directed from anode compartment 21 through at least one anode outlet port 38 through at least one anode outlet passage 40 into at least one anode discharge manifold 42. Anode inlet passage 34 and anode outlet passage 40 may be located between anode plate 22 and cathode plate 20 of adjacent fuel cells 10. The perimeters of anode inlet passage 34 and anode outlet passage 40, as well as anode feed manifold 32 and anode discharge manifold 42, may be sealed by surface gaskets 43, as illustrated in FIG. 3.

As shown in FIG. 4, second fluid manifolds 31B may include at least one cathode feed manifold 44 that may fluidly connect and direct oxidant through at least one cathode inlet passage 46 through at least one cathode inlet port 48 into cathode compartment 19. Oxidant from cathode compartment 19 may be directed from cathode compartment 19 through at least one cathode outlet port 50 through at least one cathode outlet passage 52 into at least one cathode discharge manifold 54. Cathode inlet passage 46 and cathode outlet passage 52 may be located between anode plate 22 and cathode plate 20 of adjacent fuel cells 10. The perimeters of cathode inlet passage 46 and cathode outlet passage 52, as well as cathode feed manifold 44 and cathode discharge manifold 54 may be sealed by surface gaskets 43, as illustrated in FIG. 4.

As shown in FIG. 5, first fluid manifolds 31A may include at least one coolant feed manifold 56 that may fluidly connect and direct coolant fluid through at least one coolant inlet passage 58 to a coolant flow field 86 within coolant compartment 23. Within coolant compartment 23 the coolant fluid may flow between anode plate 22 and cathode plate 20 through coolant flow field 86 comprised of a plurality of coolant channels defined by anode plate 22, as will be described further herein. Heat generated by adjacent fuel cells 10 may be transferred to the coolant fluid and removed from fuel cells 10 by the circulation of the coolant fluid. The coolant fluid from coolant compartment 23 may be directed through at least one coolant outlet passage 60 into at least one coolant discharge manifold 62. Coolant inlet passage 58 and coolant outlet passage 60 may be located between anode plate 22 and cathode plate 20 of adjacent fuel cells 10. Perimeters of coolant inlet passage 58 and coolant outlet passage 60, as well as coolant feed manifold 56 and coolant discharge manifold 62 may be sealed by surface gaskets 43, as illustrated in FIG. 5.

Figure 6A:
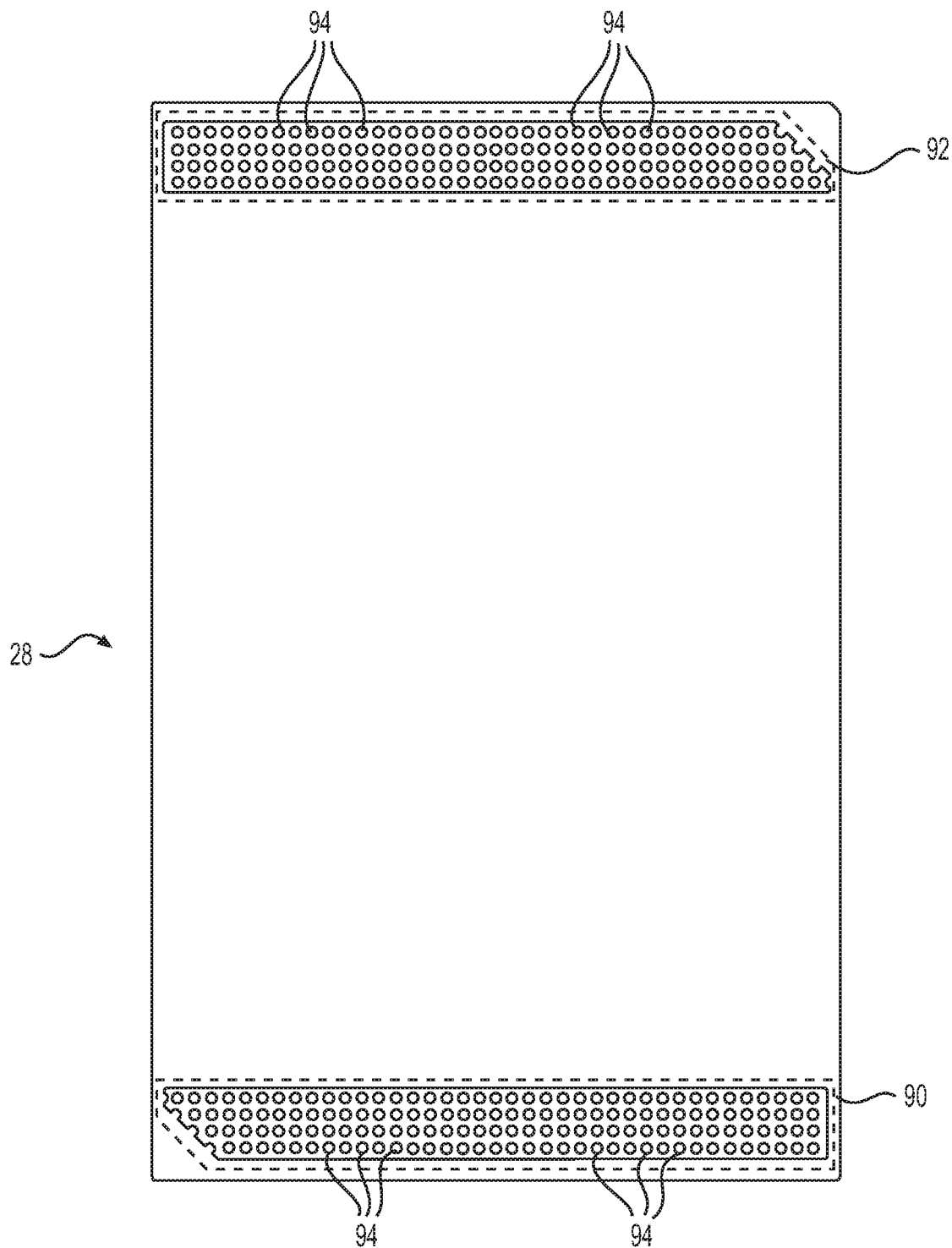
FIG. 6A is a front view of a cathode flow field of FIG. 2, according to an exemplary embodiment.

FIG. 6A is a front view of cathode flow field 28, according to exemplary embodiment. The side visible in FIG. 6A is the side configured to face adjacent cathode plate 20 (see FIG. 2). Cathode flow field 28 may comprise a porous structure, for example, in some embodiments, a porous metallic foam structure having a porous three-dimensional network structure. In some embodiments, the porous structure may be chosen from screens, expanded metal mesh, and three-dimensionally formed and pierced metal sheets. In some embodiments, the porous structure may be made of a material chosen from stainless steel, NiCr, NiSnCr, and titanium. The porous structure may be sheet-shaped with two opposing surfaces. In some embodiments, the porous metallic foam structure may have an average pore size ranging from about 50 µm to about 500 µm. In some embodiments, the porous metallic foam structure may have an average pore size of about 100 µm. Cathode flow field 28 may include a first cathode distribution channel 90 and a second cathode distribution channel 92 recessed into the surface of the porous metallic foam structure facing cathode plate 20. Cathode flow field 28 may have a thickness ranging from about 0.2 mm to about 1.5 mm and first cathode distribution channel 90 and/or second cathode distribution channel 92 may be recessed into cathode flow field at a depth of between about 10% and about 75% of the thickness.

First cathode distribution channel 90 may extend generally from one side of cathode flow field 28 to the other side along a bottom edge of cathode flow field 28. Second cathode distribution channel 92 may extend generally from one side of cathode flow field 28 to the other side along a top edge of cathode flow field 28. When cathode flow field 28 is positioned adjacent cathode plate 20, cathode inlet ports 48 may be aligned with first cathode distribution channel 90 and cathode outlet ports 50 may be aligned with second cathode distribution channel 92.

Cathode flow field 28 may include a plurality of support features 94 formed throughout first cathode distribution channel 90 and/or second cathode distribution channel 92. Support features 94 may be generally cylindrical, dimple shaped, or other suitable shape. A height of one or more support features 94 may be about equal to the recess depth of first cathode distribution channel 90 and/or second cathode distribution channel 92. First cathode distribution channel 90, second cathode distribution channel 92, and support features 94 may be formed by stamping, rolling or otherwise plastically deforming the porous metallic foam structure forming cathode flow field 28.

First cathode distribution channel 90 and second cathode distribution channel 92 may be configured to promote uniform flow distribution of oxidant along a width of cathode flow field 28 by providing an open flow path for the oxidant to flow along before flowing into the pores of the porous metallic foam structure. Support features 94 may be configured to provide adequate support during mechanical compression and also during operation to maintain the open flow path provided by first cathode distribution channel 90 and second cathode distribution channel 92 when fuel cell 10 is compressed by preventing or reducing deformation or deflection of cathode plate 20 into first cathode distribution channel 90 and second cathode distribution channel 92.

Figure 6B:
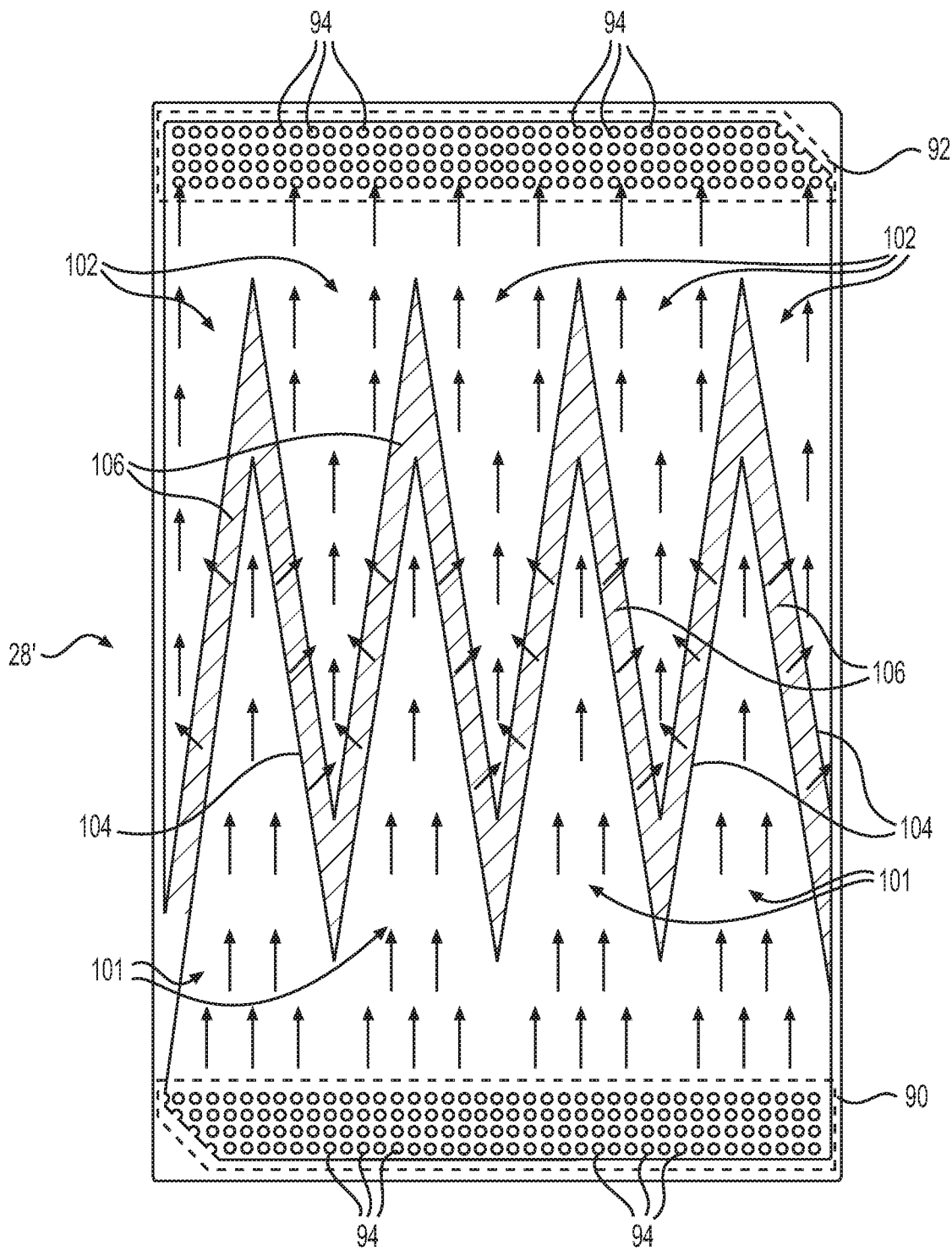
FIG. 6B is a front view of another embodiment of a cathode flow field, according to an exemplary embodiment.
Figure 6C:
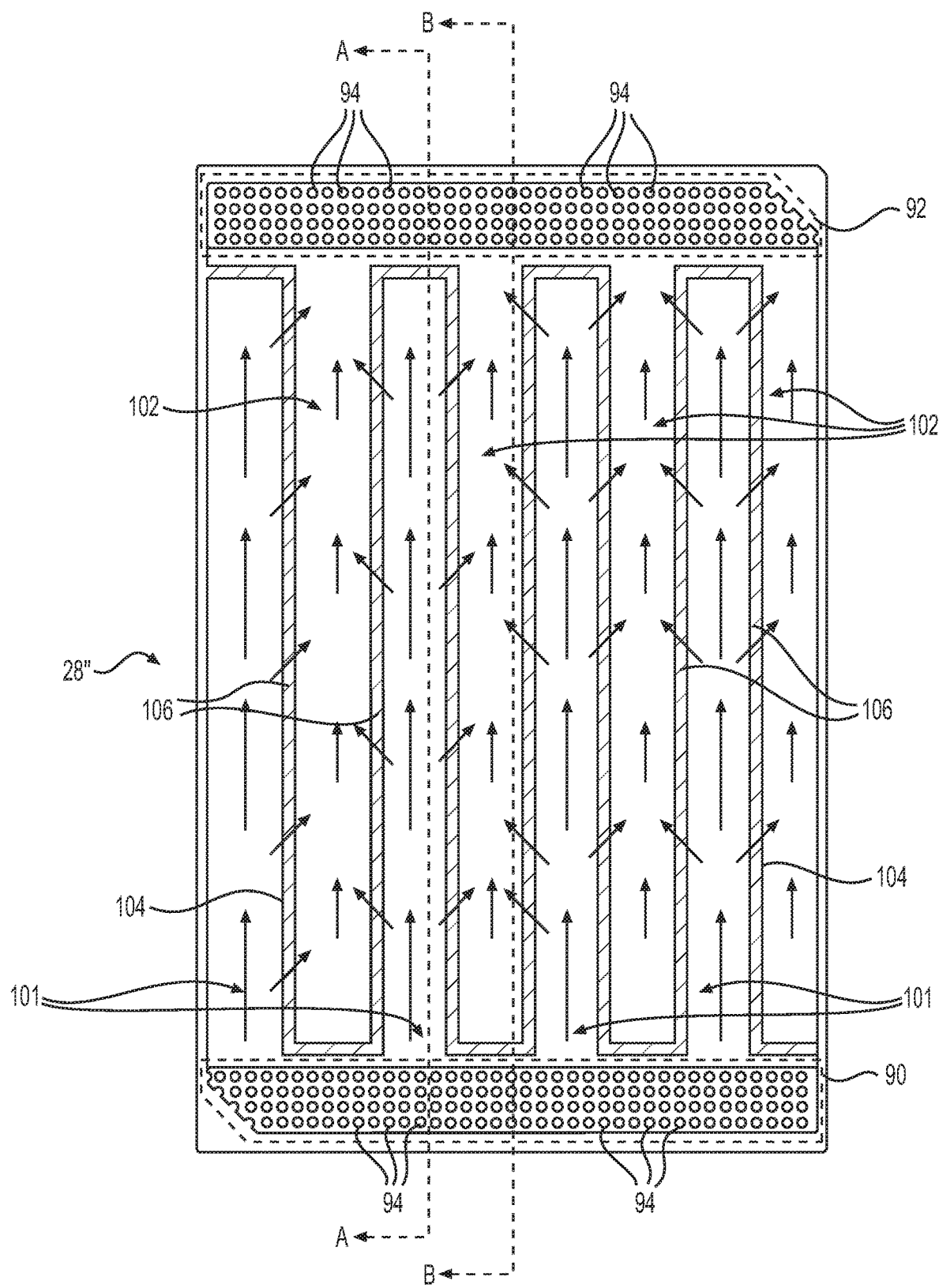
FIG. 6C is a front view of another embodiment of a cathode flow field, according to an exemplary embodiment.
Figure 6D:
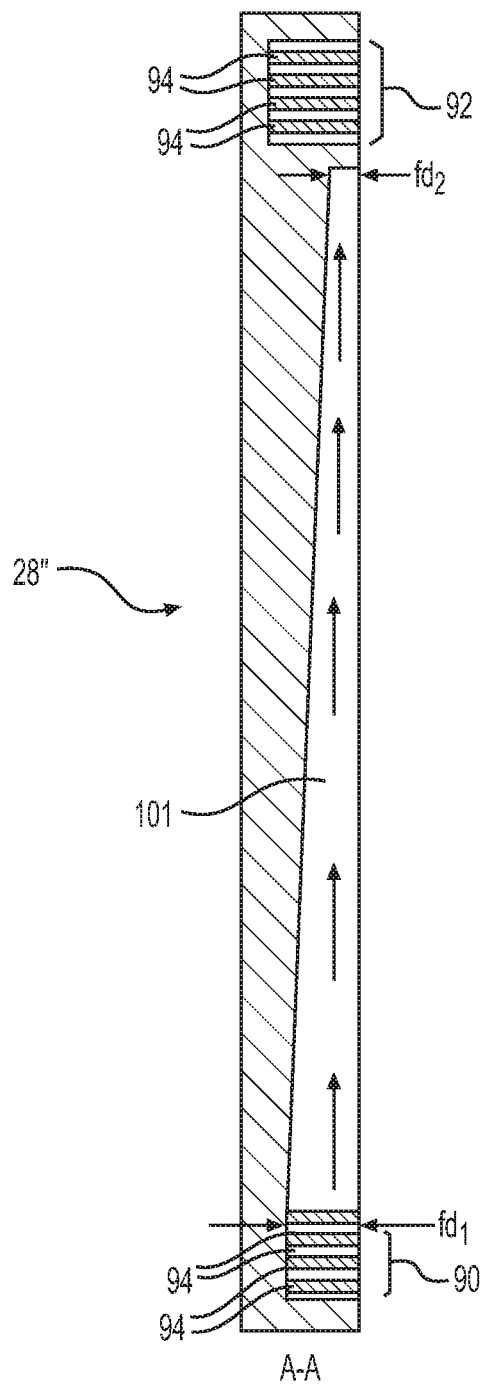
FIG. 6D is a cross-sectional view along cross-section A-A of FIG. 6C, according to an exemplary embodiment.
Figure 6E:
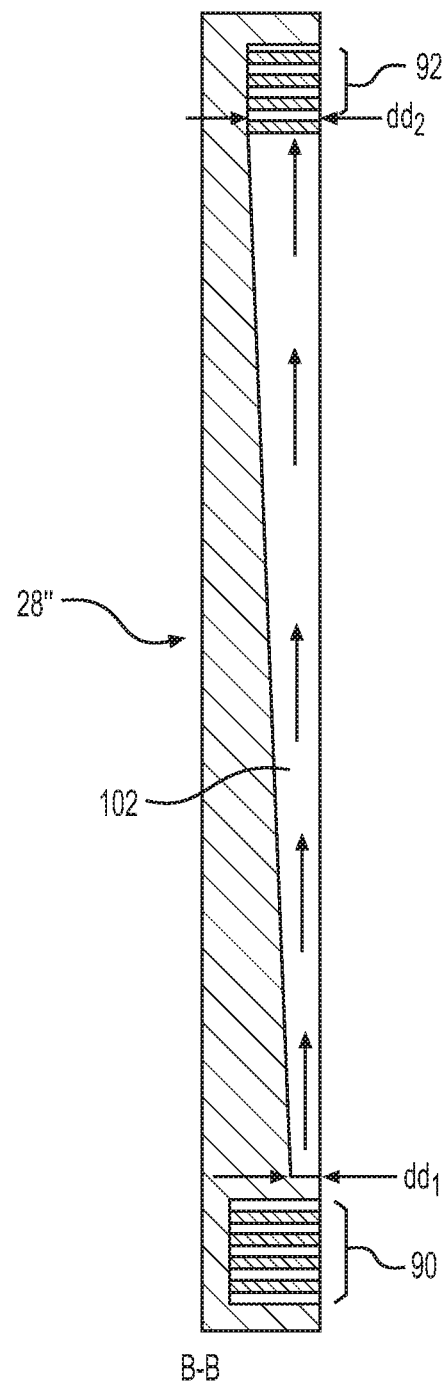
FIG. 6E is a cross-sectional view along cross-section B-B of FIG. 6C, according to an exemplary embodiment.
Figure 6F:
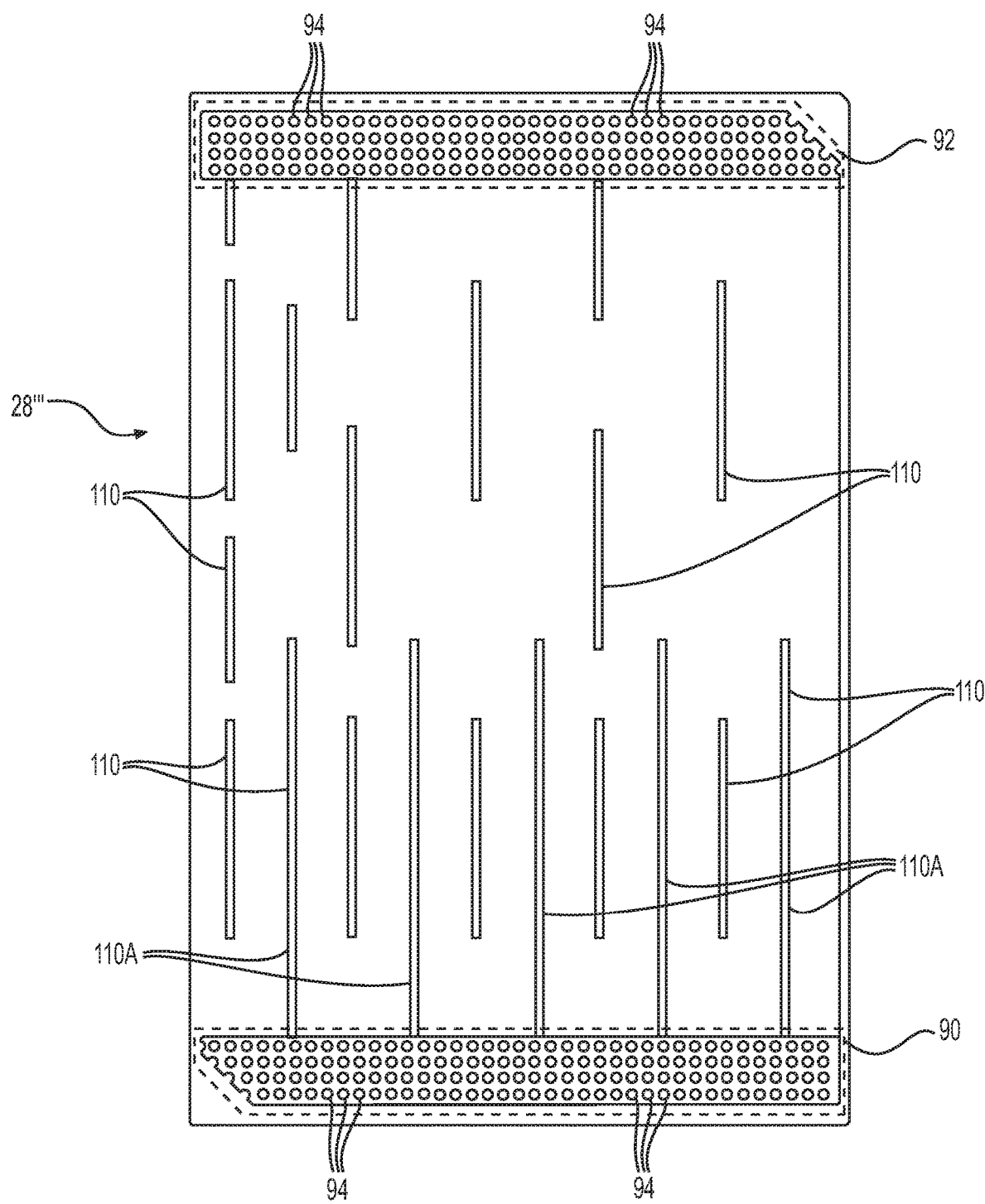
FIG. 6F is a front view of another embodiment of a cathode flow field, according to an exemplary embodiment.

FIGS. 6B, 6C, and 6F are front views of additional embodiments of cathode flow fields 28', 28", 28'". In some embodiments, cathode flow fields 28', 28", 28'" may be utilized in fuel cell 10 in place of cathode flow field 28. Cathode flow fields 28', 28", 28'" may include all the features of cathode flow field 28, as described herein, as well as the additional features as described below. The side visible in FIGS. 6B, 6C, and 6F may be the side configured to face adjacent cathode plate 20 or the side configured to face adjacent MEA 18.

Cathode flow fields 28', 28" may include a plurality of feed (or first) channels 101 and a plurality of discharge (or second) channels 102. Feed channels 101 and discharge channels 102 may be stamped, cut, molded, or otherwise formed in cathode flow field 28' on the surface facing cathode plate 20. As shown in FIGS. 6B and 6C, feed channels 101 may start at and be in fluid communication with first cathode distribution channel 90 and extend toward second cathode distribution channel 92. Discharge channels 102 may end at and be in fluid communication with second cathode distribution channel 92 and extend toward first cathode distribution channel 90. Feed channels 101 and discharge channels 102 may be interdigitated, as shown in FIG. 6B such that discharge channels 102 may be positioned between adjacent feed channels 101. In some embodiments, feed channels 101 and discharge channels 102 may be substantially free of obstructions to fluid flow to enable improved oxidant distribution. In some embodiments, feed channels 101 and discharge channels 102 may include dimples (not shown) similar to dimples 94 found in first and second cathode distribution channels 90, 92.

It is contemplated that, in certain embodiments, the plurality of feed channels 101 and discharge channels 102 may have different arrangements, shapes and/or cross-sectional areas. For example, in FIG. 6B the width of feed and discharge channels 101, 102 may vary along the length of cathode flow field 28'. In FIG. 6B the feed channels 101 start wide at or near first cathode distribution channel 90 and narrow to a point extending toward second cathode distribution channel 92 while the discharge channels start at a point and widen extending toward second cathode distribution channel 92. In some embodiments, the distal ends of the feed channels 101 may be flat rather than a point as shown in FIG. 6B. Similarly, in some embodiments the proximal ends of the discharge channels 102 may be flat rather than a point as shown in FIG. 6B. With this arrangement, there is not direct fluid communication between the feed channels 101 and discharge channels 102. Rather, oxidant distributed by first cathode distribution channel 90 to the feed channels 101 may flow through the plurality of feed channels 101 and may be forced to diffuse through the porous structure of cathode flow field 28' to adjacent discharge channels 102.

FIG. 6C shows another arrangement of feed channels 101 and discharge channels 102 for cathode flow field 28" in which the width of feed and discharge channels 101, 102 remain about the same along the length of cathode flow field 28". Although the width of feed and discharge channels 101, 102 remain about the same, a depth of feed and discharge channels 101, 102 may vary along the length of cathode flow field 28". For example, FIG. 6D shows a cross-sectional view of cathode flow field 28" along cross-section A-A through a feed channel 101. As shown in FIG. 6D, feed channels 101 may start deepest (i.e., maximum depth $fd_1$) at or near first cathode distribution channel 90 and the depth may decrease extending toward second cathode distribution channel 92. As shown in FIG. 6D, the depth may decrease at a constant rate (e.g., linearly) or in some embodiments, the depth may decrease at a variable rate (e.g., non-linearly, exponentially). As shown in FIG. 6D, feed channels 101 may dead end flat at the distal end with a minimum depth ($fd_2$). In other embodiments, feed channels 101 may dead end at the distal end with a zero minimum depth $fd_2$.

FIG. 6E shows a cross section of cathode flow field 28″ along cross-section B-B through a discharge channel 102. As shown in FIG. 6E, discharge channels 102 may start shallowest (i.e., minimum depth $dd_1$) at or near first cathode distribution channel 90 and the depth may increase extending toward second cathode distribution channel 92. Discharge channels 102 may be deepest (i.e., maximum depth $dd_2$) at or near second cathode distribution channel 92. As shown in FIG. 6E, the depth may increase at a constant rate (e.g., linearly) or in some embodiments, the depth may increase at a variable rate (e.g., non-linearly, exponentially). As shown in FIG. 6E, discharge channels 102 may start flat at the proximal end with minimum depth ($dd_1$). In other embodiments, discharge channels 101 may start at the proximal end with a zero minimum depth $dd_1$.

By varying the width (e.g., see FIG. 6B) or varying the depth (e.g., see FIGS. 6C-E) of feed and discharge channels 101, 102 the cross-sectional area available for flow of oxidant along cathode flow fields 28′, 28″ may vary (e.g., increase in discharge channels 102 or decrease in feed channels 101). The increase or decrease in the available flow area in feed and discharge channels 101, 102 along the length of cathode flow fields 28′, 28″ may be configured to correspond with the volume of oxidant that has diffused from feed channels 101 into the porous structure and diffused from the porous structure into discharge channels 102, such that the flow velocity of oxidant along the feed channels 101 and discharge channels 102 remains about constant. In other words, the cross-sectional area of feed channels 101 may decrease at a rate equal to the rate at which oxidant flows out of the feed channels 101 and diffuses into the porous structure so that the velocity of oxidant remains about constant. Similarly, the cross-sectional area of discharge channels 102 may increase at a rate equal to the rate at which oxidant flows out of the porous structure into the discharge channels 102 so that the velocity of oxidant remains about constant. In some embodiments, the width and depth of feed and discharge channels 101, 102 may both vary. For example, in some embodiments, FIGS. 6D and 6E may represent cross-sections of FIG. 6B in addition to FIG. 6C.

As shown in FIGS. 6B and 6C, there may be separating sections formed between feed channels 101 and discharge channels 102, which may be referred to as land sections 104. A thickness of the land sections 104 between feed channels 101 and discharge channels 102 may be fixed or in some embodiments the thickness may vary. For example, the thickness may be greatest closest to first cathode distribution channel 90 (e.g., between the proximal end of the feed channels 101 and distal end of the discharge channels) and the thickness may decrease towards the second cathode distribution channel 92. In other embodiments, the thickness may be thinnest closest to the first cathode distribution channel 90 and the thickness may increase towards the second cathode distribution channel 92. In other embodiments, the thickness of land sections 104 may be thickest or thinnest about midway between the first cathode distribution channel 90 and the second cathode distribution channel 92.

In some embodiments, a plurality of micro channels 106 may be formed in cathode flow fields 28′, 28″ in land sections 104. Micro channels 106 may be formed along the entire length or just a portion of land sections 104. Micro channels 106 may be configured to fluidly connect feed channels 101 with discharge channels 102 in order to create a preferred flow path for oxidant compared to the porous network provided by cathode flow fields 28′, 28″. For these embodiments, in conjunction with diffusing or rather than diffusing, oxidant may flow through the micro channels from feed channels 101 to discharge channels 102. The micro channels 106 may be sized and spaced in such a way to provide oxidant availability to a majority of catalyst sites that would otherwise be shadowed by the land sections of cathode flow fields 28′, 28″.

The number of feed and discharge channels 101, 102 may be adjusted based on one or more different parameters, including for example, a width of cathode flow fields 28′, 28″, a width of feed channels 101, a width of discharge channels 102, the application of fuel cell 10, the intended or designed operating pressure for the oxidant, the intended or designed operating flow rate for the oxidant, the intended or designed power output for fuel cell 10, or any combination of these parameters.

Cathode flow fields 28′, 28″ may present a number of benefits. For example, feed channels 101 and discharge channels 102 provide a larger cross-sectional area through which the oxidant can flow, which can reduce the pressure drop across the porous flow field compared to other porous flow field structures. In addition to the feed channels 101 and discharge channels 102, the micro channels may also provide an increased cross-sectional area through which the oxidant gas can flow between the feed channels 101 and discharge channels 102, which can further reduce the pressure drop across the porous flow field. By reducing the pressure drop the amount of energy required to pressurize the oxidant (e.g., blower power) may be reduced, which, in turn, can improve the overall performance and efficiency (e.g., improve power density and reduce parasitic loading) of fuel cell 10. In addition, the features of cathode flow fields 28′, 28″ may more uniformly distribute fresh oxidant within the porous flow field in order to increase the oxygen concentration near the outlet of the cathode flow field (e.g., feed channels 101, discharge channels 102, and micro channels). This can enable the incoming flow of oxidant to remain, for example, oxygen rich until the flow is distributed through the porous body, which can result in better cell voltage and potentially higher current density.

Cathode flow field 28‴, as shown in FIG. 6F, may include a plurality of channels 110 formed (e.g., pressed, embossed, or cut) into its surface. The plurality of channels 110 may include a first set of channels 110A that begin at first cathode distribution channel 90 and extend about halfway toward second cathode distribution channel 92. The first set of channels 110A are configured to enable fresh oxidant (e.g., oxidant which has not yet been consumed) to travel directly to the second half of the cathode flow field 28‴ where oxidant can often have lower oxygen concentrations. The first set of channels 110A may be dimensioned such that they sit on top of a land section. The other channels 110 may be configured to reduce overall pressure drop and facilitate mixing and/or uniform distribution. For some embodiments, the stock material used for cathode flow field 28‴ may come with non-uniformity that would result in non-uniform pressure drop and flow characteristics. Channels 110 are designed to help address this issue by enabling more uniform pressure drop and flow characteristics. The first set of channels 110A also help reduce flowrate and thus flow velocity at the leading edge of the active area, which in turn reduces the removal of moisture in that region, providing better operation and performance in dry conditions. This also helps balance the humidity and oxygen concentration distribution along the flow path of cathode flow field 28''', which, as a result of the electrochemical reactions, balances current and temperature distribution across the active area. This improves the durability and reliability of the fuel cells and stack. In some embodiments, first set of channels 110A may be positioned opposite any flow channels on the anode or coolant side of the fuel cell to avoid the potential for the high velocity effect to constructively interfere and increase the risk of the cell potentially drying out.

The porous structure making up cathode flow field 28 (or 28'' or 28''') may include one or more metals and/or alloys. For example, the porous structure may include a combination of at least nickel (Ni) and chromium (Cr) (e.g., NiCr) or nickel, tin (Sn), and chromium (e.g., NiSnCr). For NiCr embodiments of the porous structure the concentrate by mass of chromium can range from about 20% to about 40% by mass, while nickel may make up the remaining balance— about 60% to about 80% by mass. For NiSnCr embodiments of the porous structure the concentration of chromium can range from about 3% to about 6% by mass, the concentration of tin can range from about 10% to about 20% by mass, while nickel may make up the balance—about 74% to about 87%.

In some embodiments, at least one surface of the porous structure may include a chromium concentration ranging from about 3% to about 50% by mass. For example, the chromium concentration of one or both surfaces of the porous structure that forms cathode flow field 28 may range from about 3% to about 50%, about 5% to about 40%, or from about 7% to about 40% by mass. Increasing the chromium concentration of the surface of the porous metal body may be advantageous because it increases the corrosion resistance of the porous structure in acidic environments. For example, when at least one of the surfaces of the porous structure forming the cathode flow field has a chromium concentration ranging from about 3% to about 50% by mass, the bipolar plate including the porous structure may be advantageously corrosion resistant in the substantially acidic environment at the cathode. The improved corrosion resistance provided by the porous structure as described herein may advantageously enable the cathode plate to be formed of uncoated stainless steel rather than coated stainless steel, which has been traditionally used because of its corrosion resistance properties.

In some embodiments, one surface of the porous structure may have a higher chromium concentration than the other surface of the porous structure. In such instances, the surface having the higher chromium concentration may advantageously be more corrosion resistant. The surface having the higher chromium concentration may be arranged to face MEA 18. In some embodiments, the more corrosion-resistant surface of the porous structure may have a chromium concentration ranging from about 3% to about 50% by mass while the less corrosion-resistance surface of the metal porous structure may have a chromium concentration of less than about 3% chromium by mass.

The various embodiments of the porous structure described herein may be formed by one or more electroplating processes. For example, in some embodiments, a resin-molded body may initially be used as a substrate for the three-dimensional network structure. The resin-molded body may include one or more of polyurethane, melamine, polypropylene, polyethylene, or the like. The resin-molded body may include pores in its three-dimensional network structure. In some embodiments, the resin-molded body may have a porosity ranging from about 80% to about 98% and may have a pore size of about 50 µm to about 500 µm. In some embodiments, the resin molded body may have a thickness of about 150 µm to about 5,000 µm, about 200 µm to 2,000 µm, or about 300 µm to about 1,200 µm.

To form the porous structure, metal layers may be plated onto the resin-molded body. For the NiCr embodiments of the porous structure, for example, a nickel layer and a chromium layer may be plated onto the resin-molded body. For the NiSnCr embodiments of the porous structure, for example, a nickel layer, a tin layer, and a chromium layer may be plated onto the resin-molded body. The resin-molded body may be subjected to electrical conduction treatment, such as electroless plating (auto-catalytic plating), vapor deposition, sputtering, and/or application of a conductive metal, such as nickel particles, tin particles, and/or carbon particles. Then, a nickel layer and/or a tin layer may be electrically plated on the surface of the three-dimensional structure or the skeletons of the treated resin-molded body. For example, when the resin molded body is coated with a conductive layer, a nickel layer may be subsequently formed on the skeletons of the resin-molded body through an electroplating process. After a nickel layer is formed, a tin layer may be subsequently formed on the skeletons of the resin-molded body through another electroplating process. Alternatively, when the resin-molded body is coated with a conductive layer, a tin layer may be electroplated first, followed by the electroplating of a nickel layer. In some embodiments, chemical vapor deposition may be used to add chromium to a substantially nickel structure. For example, in some embodiments, chromium may be added via chemical vapor deposition at a concentration ranging from about 15% to about 50%, by mass, to a substantially nickel structure.

In some embodiments, after one or more metal layers are plated onto the skeletons of the resin-molded body, such as a nickel layer and/or a tin layer, a chromium layer may be added through an electroplating process. In some embodiments, the chromium plating layer may be formed such that the chromium concentration of at least one surface of the porous structure ranges from about 3% to about 50% by mass. After the chromium plating layer has been plated or after the nickel and/or tin plating layers are plated, the porous structure may be formed by removing the initial resin-molded body by heat treatment. For example, the porous structure may be heated in an inert atmosphere or a reduced atmosphere at a temperature in the range from about 900° C. to about 1300° C.

Figure 7:
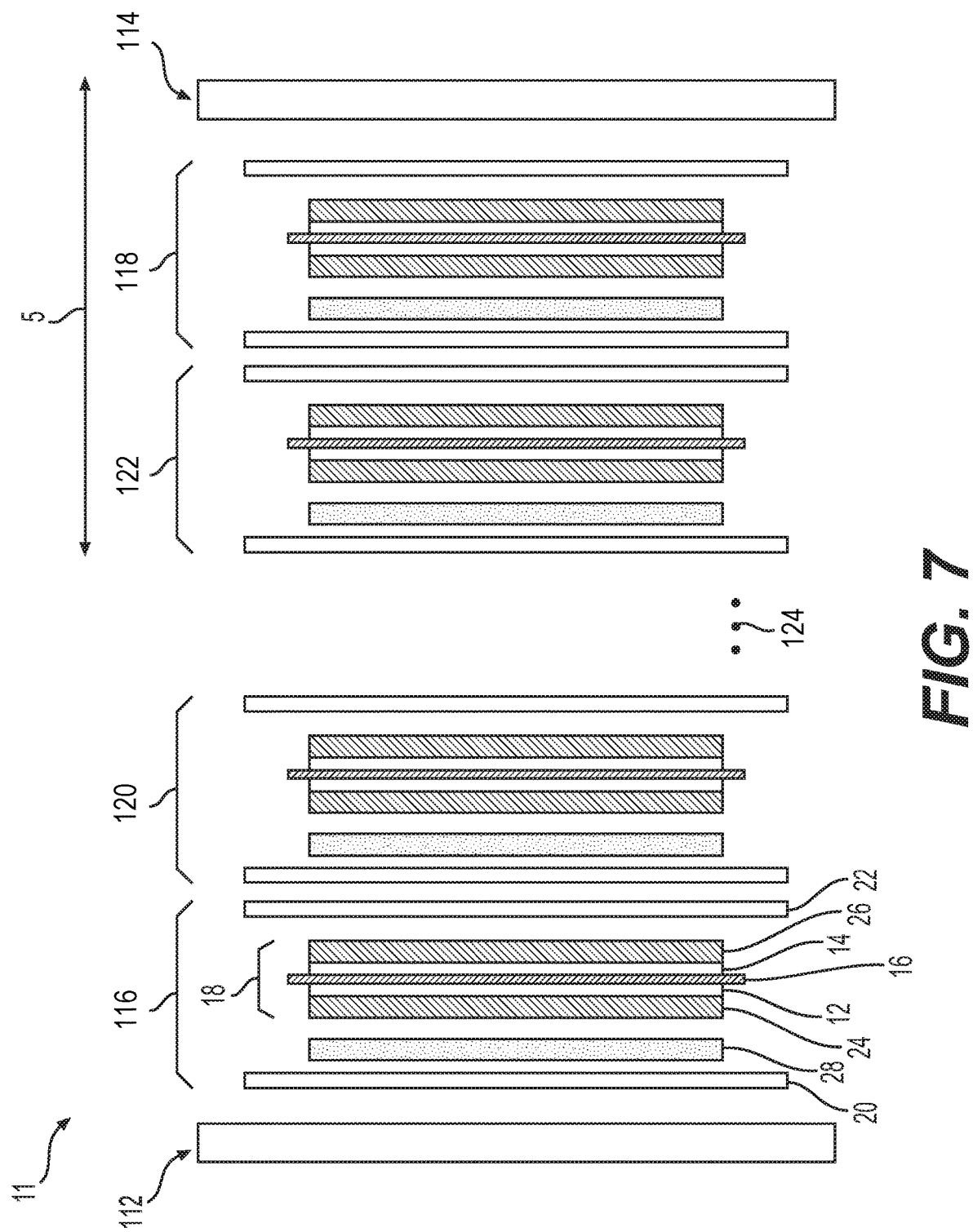
FIG. 7 is a side schematic view of a plurality of electrochemical cells (e.g., fuel cells) stacked together, according to an exemplary embodiment.

With regard to FIG. 7, depicted therein is an electrochemical cell stack assembly 11 that may include a plurality of electrochemical cells, according to an exemplary embodiment of the present disclosure. Arranged along longitudinal axis 5, in order of appearance, may be a first end 112, a first electrochemical cell 116, a second electrochemical cell positioned adjacent the first electrochemical fuel cell 120, one or more electrochemical cells 124, a third electrochemical cell 122 positioned adjacent a last electrochemical cell 118, and an opposite end 114. As described above, each of the plurality of electrochemical cells (e.g., cells 116, 118, 120, 122, and 124), described in FIG. 7 may include cathode catalyst layer 12, anode catalyst layer 14, proton exchange membrane 16, cathode gas diffusion layer 24, and anode diffusion layer 28, all of which cooperatively make up membrane electrode assembly 18. Each of the electrochemical cells may further include cathode flow field 28, cathode plate 20, and anode plate 22. Cathode flow field 28 of one or more of the electrochemical cells within electrochemical cell stack assembly 11 may be a porous structure and each porous structure may have an average pore size and the plurality of electrochemical cells within electrochemical cell stack assembly 11 together may have an average pore size.

In some embodiments, the porous structure of first electrochemical cell 116 may have an average pore size greater than the average pore size of the porous structures of the plurality of electrochemical cells. In some embodiments, the average pore size of the porous structure of first electrochemical cell 116 may be about 5% to about 50% greater than the average pore size of the porous structure of the plurality of electrochemical cells.

In some embodiments, the porous structure of first electrochemical cell 116 may have a flow resistance less than the average flow resistance of the porous structures of the plurality of electrochemical cells. In some embodiments, the flow resistance of the porous structure of first electrochemical cell 116 may be about 5% to about 50% less than the average flow resistance of the porous structure of the plurality of electrochemical cells. In some embodiments, the flow resistance of the porous structure of first electrochemical cell 116 may be about 5%, 6%, 7%, 8%, 9%, 10%, 15%, 20%, 25%, 30%, 40%, or 50% less than the average flow resistance of the porous structure of the plurality of electrochemical cells. For example, in some embodiments, a less-than-average flow resistance may be achieved by employing a cathode flow field having, e.g., interdigitated channels which result in a reduced oxidant pressure drop across the porous flow field, such as cathode flow field 28', 28", or 28''', as shown in FIGS. 6B-6F.

In some embodiments, the average pore size of the porous structure of second electrochemical cell 120 positioned adjacent first electrochemical cell 116 may be about the same as the average pore size of the porous structures of the plurality of electrochemical cells. In some embodiments, the porous structure of the second electrochemical cell 120 may have an average pore size greater than the average pore size of the porous structures of the plurality of electrochemical cells. In some embodiments, the porous structure of the second electrochemical cell 120 may have an average pore size greater than the average pore size of the porous structures of the plurality of electrochemical cells, but less than the average pore size of the porous structure of first electrochemical cell 116. In some embodiments, the average pore size of the porous structure of second electrochemical cell 120 may be about 5% to about 50% greater than the average pore size of the porous structures of the plurality of electrochemical cells.

In some embodiments, the porous structure of second electrochemical cell 120 may have a flow resistance less than the average flow resistance of the porous structures of the plurality of electrochemical cells. In some embodiments, the porous structure of second electrochemical cell 120 may have a flow resistance less than the average flow resistance of the porous structures of the plurality of electrochemical cells, but greater than the flow resistance of the porous structure of the first electrochemical cell 116. In some embodiments, the flow resistance of the porous structure of second electrochemical cell 120 may be about 5% to about 50% less than the average flow resistance of the porous structure of the plurality of electrochemical cells. In some embodiments, the flow resistance of the porous structure of second electrochemical cell 120 may be about 5%, 6%, 7%, 8%, 9%, 10%, 15%, 20%, 25%, 30%, 40% or 50% less than the average flow resistance of the porous structures of the plurality of electrochemical cells. For example, in some embodiments, a less-than-average flow resistance may be achieved by employing a cathode flow field having, e.g., interdigitated channels which result in a reduced oxidant pressure drop across the porous flow field, such as cathode flow field 28', 28", or 28''', as shown in FIGS. 6B-6F.

In some embodiments, the average pore size of the porous structure of last electrochemical cell 118 is about the same as the average size of the porous structures of the plurality of electrochemical cells. In some embodiments, the porous structure of last electrochemical cell 118 may have an average pore size greater than the average pore size of the porous structures of the plurality of electrochemical cells. In some embodiments, the porous structure of last electrochemical cell 118 may have an average pore size about the same as the average pore size of the porous structure of first electrochemical cell 116 and/or second electrochemical cell 120. In some embodiments, the average pore size of the porous structure of last electrochemical cell 118 may be about 5% to about 50% greater than the average pore size of the porous structures of the plurality of electrochemical cells.

In some embodiments, the porous structure of last electrochemical cell 118 may have a flow resistance less than the average flow resistance of the porous structures of the plurality of electrochemical cells. In some embodiments, the flow resistance of the porous structure of last electrochemical cell 118 may be about 5% to about 50% less than the average flow resistance of the porous structures of the plurality of electrochemical cells. In some embodiments, the flow resistance of the porous structure of the last electrochemical cell 118 may be about 5%, 6%, 7%, 8%, 9%, 10%, 15%, 20%, 25%, 30%, 40%, or 50% less than the average flow resistance of the porous structures of the plurality of electrochemical cells. For example, in some embodiments, a less-than-average flow resistance may be achieved by employing a cathode flow field having, e.g., interdigitated channels which result in a reduced oxidant pressure drop across the porous flow field, such as cathode flow field 28', 28", or 28''', as shown in FIGS. 6B-6F.

In some embodiments, the average pore size of the porous structure of third electrochemical cell 122 may be about the same as the average pore size of the porous structure of the plurality of electrochemical cells. In some embodiments, the porous structure of the third electrochemical cell 122 may have an average pore size greater than the average pore size of the porous structures of the plurality of electrochemical cells. In some embodiments, the porous structure of the third electrochemical cell 122 may have an average pore size greater than the average pore size of the porous structures of the plurality of electrochemical cells, but less than the average pore size of the porous structure of last electrochemical cell 118. In some embodiments, the average pore size of the porous structure of third electrochemical cell 122 may be about 5% to about 50% greater than the average pore size of the porous structures of the plurality of electrochemical cells.

In some embodiments, the porous structure of third electrochemical cell 122 may have a flow resistance less than the average flow resistance of the porous structures of the plurality of electrochemical cells. In some embodiments, the porous structure of third electrochemical cell 122 may have a flow resistance less than the average flow resistance of the porous structures of the plurality of electrochemical cells, but greater than the flow resistance of the porous structure of the last electrochemical cell 122. In some embodiments, the flow resistance of the porous structure of third electrochemical cell 122 may be about 5% to about 20% less than the average flow resistance of the porous structures of the plurality of electrochemical cells. In some embodiments, the flow resistance of the porous structure of third electrochemical cell 122 may be about 5%, 6%, 7%, 8%, 9%, 10%, 15%, 20%, 25%, 30%, 40% or 50% less than the average flow resistance of the porous structures of the plurality of electrochemical cells. For example, in some embodiments, a less-than-average flow resistance may be achieved by employing a cathode flow field having, e.g., interdigitated channels which result in a reduced oxidant pressure drop across the porous flow field, such as cathode flow field 28', 28", or 28''', as shown in FIGS. 6B-6F.

The increased average pore size of the porous structure of one or more of the plurality of cells (e.g., first electrochemical cell 116, second electrochemical cell 120, third electrochemical cell 122, and/or last electrochemical cell 118) may result in a flow resistance within these porous structure(s) of about 5% to about 20% less than the average flow resistance of the porous structures of the plurality of electrochemical cells. This difference in flow resistance may, in turn, result in a more favorable flow path through these porous structure(s) for the reactant gases (e.g., oxygen), which may result in a higher flow rate. This higher reactant gas flow rate through one or more of the plurality of cells (e.g., first electrochemical cell 116, second electrochemical cell 120, third electrochemical cell 122, and/or last electrochemical cell 118) may advantageously prevent or minimize the incidence of flooding in these cells caused by their lower operating temperature resulting from their positioning at the ends of the stack assembly 11. Preventing or minimizing the incidence of flooding in these cells can improve the stability of and prolong the longevity of these electrochemical cell(s) and the electrochemical cell stack as a whole.

As will be appreciated by one of ordinary skill in the art, the differences in average pore size and flow resistance described herein are merely exemplary and can be optimized based on the particular application for which the electrochemical cell stack is designed. For example, an application where a high current density is required may require a lower flow resistance in the end cells to provide more flow as the higher current density may lead to a larger difference in temperature between the end electrochemical cells and the plurality of electrochemical cells in between and thus a greater accumulation of water resulting in a higher incidence of flooding. Additionally, one of ordinary skill in the art will realize that electrochemical cell stack assembly 11 described in FIG. 7 is merely exemplary and there can be additional electrochemical cells within the plurality of electrochemical cells with an average pore size greater than average pore size of the porous structure of the plurality of electrochemical cells and a flow resistance less than the average flow resistance of the plurality of electrochemical cells.

EXAMPLE 1

Measurement of Electrochemical Cell Flow Resistance

An assembled electrochemical fuel cell may be connected via cathode feed manifold, to a reactant gas, for example, oxygen. The flow of oxygen may be initiated, increased, and measured to simulate the flow rate an electrochemical cell would experience in a typical electrochemical cell stack assembly. The pressure at, for example, the cathode feed manifold and cathode discharge manifold may be measured using, for example, a manometer and the difference in pressure at the feed and discharge may provide the pressure drop of the porous structure of the cathode flow field with the cell. The ratio of measured pressure drop to measure flow rate is then representative of the flow resistance expected from the cell in operation.

The foregoing description has been presented for the purposes of illustration. It is not exhaustive and is not limited to precise forms or embodiments disclosed. Modifications, adaptations, and other applications of the embodiments will be apparent from consideration of the specification and practice of the disclosed embodiments. For example, the described embodiments of fuel cell 10 may be adapted for used with a variety of electrochemical cells. For example, although the present disclosure primarily focus on fuel cells with a anode channel flow field and cathode porous flow field, it is contemplated that some of these features may be utilized in fuel cells utilizing anode and cathode flow fields or fuel cells utilizing anode and cathode porous flow fields. Similarly, the arrangement of cells and the electrochemical stacks described herein are merely exemplary and may be applied to a range of other fuel cells configurations.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

The features and advantages of the disclosure are apparent from the detailed specification, and thus, it is intended that the appended claims cover all cells and cell stacks falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Throughout the specification the terms "generally parallel" and "generally perpendicular" may be used to describe the arrangement of one or more components in relation to an axis, plane, or other component. The degree of offset from parallel and perpendicular that can be tolerated when describing an arrangement as "generally parallel" or "generally perpendicular" can vary. The allowable offset may be, for example, less than about 20 degrees off, such as an offset less than about 10 degrees, an offset of less than about 5 degrees, and offset of less than about 3 degrees, an offset of less than about 2 degrees, and an offset of less than about 1 degree.

As used herein, the term "about" is used to modify a numerical value above and below the stated value by a variance of 20%, 10%, 5%, or 1%. In some embodiments, the term "about" is used to modify a numerical value above and below the stated value by a variance of 10%. In some embodiments, the term "about" is used to modify a numerical value above and below the stated value by a variance of 5%. In some embodiments, the term "about" is used to modify a numerical value above and below the stated value by a variance of 1%.

As used herein, the terms "adjacent" and "adjacent to" are used interchangeably and describe the relative position of two or more objects as being next to or adjoining. For example, in some embodiments, if in an electrochemical cell fuel stack two electrochemical fuel cells are described as being "adjacent" or "adjacent to one another," that is to be understood to mean that there are no electrochemical fuel cells in between said electrochemical fuel cells.

As used herein, the terms "fuel cell" and "electrochemical fuel cell," and plural variants thereof, may be used interchangeably and are understood to be identical in meaning.

Other embodiments of the present disclosure will be apparent to those skilled in the art from consideration of the specification and practice of the present disclosure herein. It is intended that the specification and examples be considered as exemplary only, with a true scope and spirit of the present disclosure being indicated by the following claims.

What is claimed is:

1. An electrochemical cell stack, comprising:
   a plurality of electrochemical cells, each electrochemical cell comprising:
      a membrane electrode assembly comprising a cathode catalyst layer, an anode catalyst layer, and a polymer membrane interposed between the cathode catalyst layer and the anode catalyst layer;
      an anode plate and a cathode plate with the membrane electrode assembly interposed therebetween; and
      a cathode flow field positioned between the cathode plate and the cathode catalyst layer, wherein the cathode flow field comprises a porous structure having a plurality of pores having an average pore size,
   wherein the plurality of electrochemical cells includes a first electrochemical cell positioned at a first end of the electrochemical cell stack;
   wherein the porous structure of the first electrochemical cell has an average pore size greater than an average pore size of the porous structures of the plurality of electrochemical cells; and
   wherein the porous structure of the first electrochemical cell has a flow resistance less than an average flow resistance of the porous structures of the plurality of electrochemical cells.

2. The electrochemical cell stack according to claim 1, wherein the average pore size of the porous structure of the first electrochemical cell is about 5% to about 50% greater than the average pore size of the porous structure of the plurality of electrochemical cells, and wherein the flow resistance of the porous structure of the first electrochemical cell is about 5% to about 50% less than the average flow resistance of the porous structure of the plurality of electrochemical cells.

3. The electrochemical cell stack according to claim 2, wherein the flow resistance of the porous structure of the first electrochemical cell is about 15% less than the average flow resistance of the porous structure of the plurality of electrochemical cells.

4. The electrochemical cell stack according to claim 1, wherein the plurality of electrochemical cells includes a last electrochemical cell positioned at the opposite end of the stack to the first electrochemical cell, wherein the porous structure of the last electrochemical cell has an average pore size greater than an average pore size of the porous structures of the plurality of electrochemical cells.

5. The electrochemical cell stack according to claim 4, wherein the average pore size of the porous structure of the last electrochemical cell is about 5% to about 50% greater than the average pore size of the porous structure of the plurality of electrochemical cells, and wherein the flow resistance of the porous structure of the last electrochemical cell is about 5% to about 50% less than the average flow resistance of the porous structure of the plurality of electrochemical cells.

6. The electrochemical cell stack according to claim 5, wherein the flow resistance of the porous structure of the last electrochemical cell is about 15% less than the average flow resistance of the porous structure of the plurality of electrochemical cells.

7. The electrochemical cell stack according to claim 4, wherein the plurality of electrochemical cells includes a third electrochemical cell positioned adjacent the last electrochemical cell, wherein the porous structure of the third electrochemical cell positioned adjacent the last electrochemical cell has an average pore size greater than the average pore size of the porous structures of the plurality of electrochemical cells.

8. The electrochemical cell stack according to claim 7, wherein the average pore size of the porous structure of the third electrochemical cell is about 5% to about 50% greater than the average pore size of the porous structure of the plurality of electrochemical cells, and wherein the flow resistance of the porous structure of the third electrochemical cell is about 5% to about 50% less than the average flow resistance of the porous structure of the plurality of electrochemical cells.

9. The electrochemical cell stack according to claim 8, wherein the flow resistance of the porous structure of the third electrochemical cell is about 5% less than the average flow resistance of the porous structure of the plurality of electrochemical cells.

10. The electrochemical cell stack according to claim 1, wherein the plurality of electrochemical cells includes a second electrochemical cell positioned adjacent the first electrochemical cell, wherein the porous structure of the second electrochemical cell positioned adjacent the first electrochemical cell has an average pore size greater than the average pore size of the porous structures of the plurality of electrochemical cells.

11. The electrochemical cell stack according to claim 10, wherein the average pore size of the porous structure of the second electrochemical cell is about 5% to about 50% greater than the average pore size of the porous structure of the plurality of electrochemical cells, and wherein the flow resistance of the porous structure of the second electrochemical cell is about 5% to about 50% less than the average flow resistance of the porous structure of the plurality of electrochemical cells.

12. The electrochemical cell stack according to claim 11, wherein the flow resistance of the porous structure of the second electrochemical cell positioned adjacent the first electrochemical cell is about 15% less than the average flow resistance of the porous structure of the plurality of electrochemical cells.

13. The electrochemical cell stack according to claim 1, wherein the porous structure of at least one of the plurality of electrochemical cells includes nickel and chromium, and wherein the nickel concentration ranges from about 60% to about 80% by mass and the chromium concentration ranges from about 20% to about 40% by mass.

14. The electrochemical cell stack according to claim 13, wherein the porous structure of the at least one electrochemical cell has a first surfaces with a higher chromium concentration than an opposite second surface.

15. The electrochemical cell stack according to claim 1, wherein the porous structure of at least one of the plurality of electrochemical cells includes nickel and chromium, and wherein the chromium concentration ranges from about 3% to about 6% by mass and the nickel concentration ranges from about 74% to about 87% by mass.

16. The electrochemical cell stack according to claim 15, wherein the porous structure further includes tin in a concentration ranging from about 10% to about 20% by mass.

17. The electrochemical cell stack according to claim 1, wherein the porous structure of the first electrochemical cell has a plurality of interdigitated feed channels and discharge channels stamped into the surface of the porous structure facing the cathode plate, wherein the feed channels start at and are in fluid communication with a first cathode distribution channel and extend toward a second cathode distribution channel, and the discharge channels end at and are in fluid communication with the second cathode distribution channel and extend toward the first cathode distribution channel.

18. The electrochemical cell stack according to claim 17, wherein the width and/or the depth of the feed channels and the discharge channels vary along the length of the porous structure.

19. The electrochemical cell stack according to claim 17, wherein the porous structure includes one or more land sections formed between the feed channels and the discharge channels, wherein the thickness of the one or more land sections varies along the length of the porous structure.

20. An electrochemical cell stack, comprising:
a plurality of electrochemical cells stacked along a longitudinal axis, each electrochemical cell comprising:
  a membrane electrode assembly comprising a cathode catalyst layer, an anode catalyst layer, and a polymer membrane interposed between the cathode catalyst layer and the anode catalyst layer;
  an anode plate and a cathode plate with the membrane electrode assembly interposed therebetween, wherein the anode plate defines a plurality of channels that form an anode flow field facing the anode catalyst layer; and
  a cathode flow field positioned between the cathode plate and the cathode catalyst layer, wherein the cathode flow field comprises a porous structure;
wherein the plurality of channels forming the anode flow field are generally square-shaped corrugated channels, the plurality of channels include anode channels open to the anode side configured to direct the flow of fuel across the anode catalyst layer, and the plurality of channels also include coolant channels open to the reverse side configured to direct coolant flow;
wherein the plurality of electrochemical cells includes a first electrochemical cell positioned at a first end of the electrochemical cell stack;
wherein the porous structure of the first electrochemical cell has an average pore size greater than an average pore size of the porous structures of the plurality of electrochemical cells; and
wherein the porous structure of the first electrochemical cell has a flow resistance less than an average flow resistance of the porous structures of the plurality of electrochemical cells.

* * * * *